May 18, 1937.   D. OLIVARES   2,080,897
PLANTING DEVICE
Filed Dec. 16, 1936    2 Sheets-Sheet 1
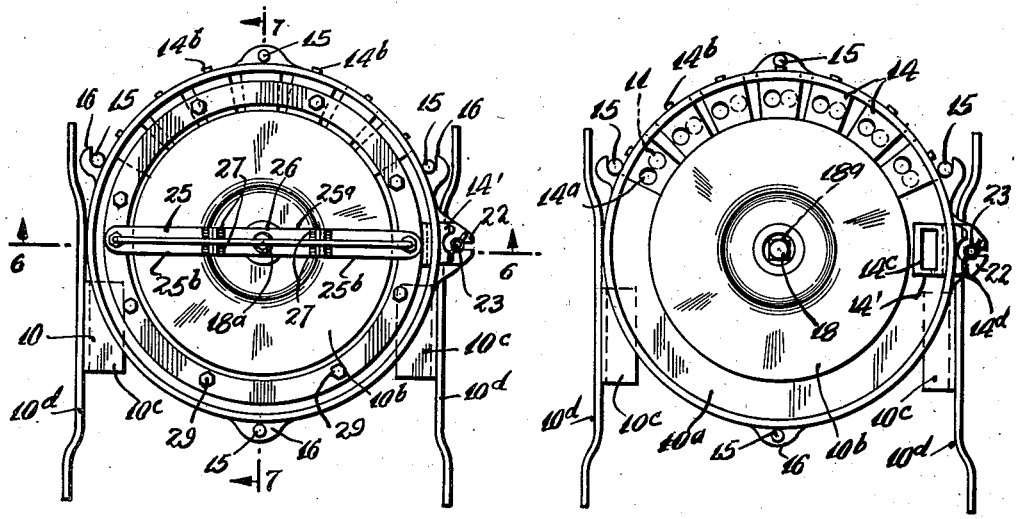
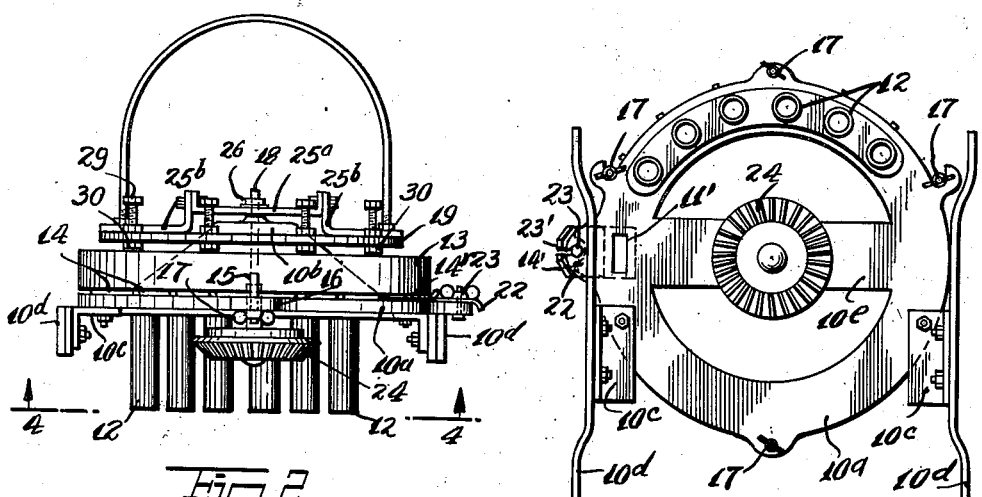
INVENTOR
Domingo Olivares
BY
ATTORNEY

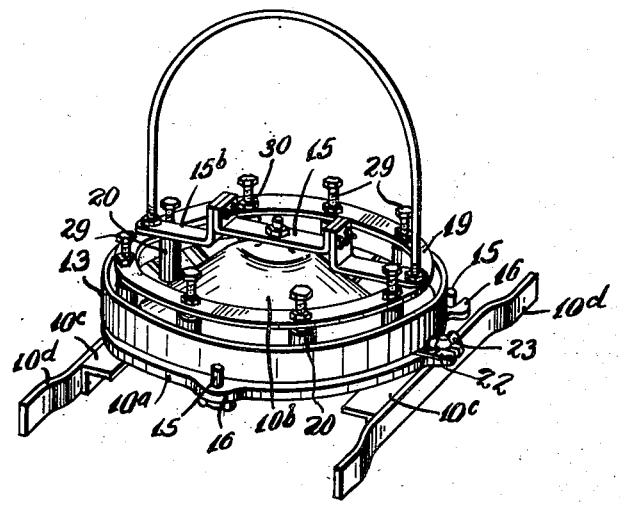
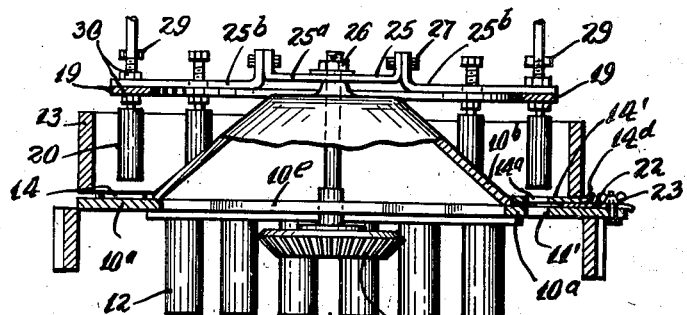
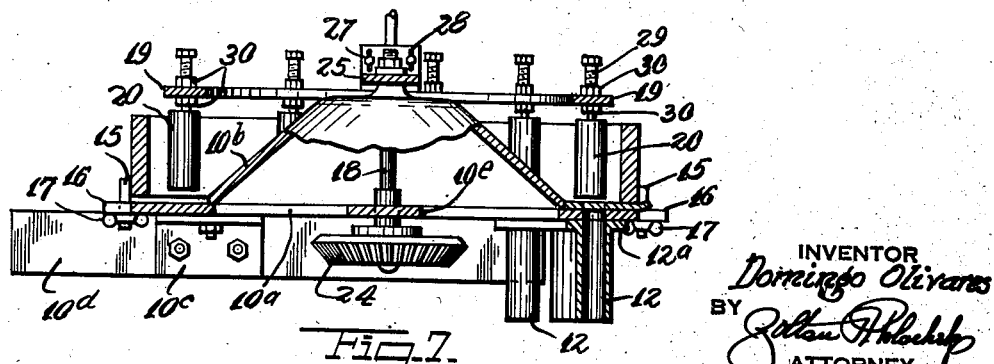

Patented May 18, 1937

2,080,897

UNITED STATES PATENT OFFICE 2,080,897

PLANTING DEVICE

Domingo Olivares, Agua Dulce, Tex.

Application December 16, 1936, Serial No. 116,104

9 Claims. (Cl. 221—120)

This invention relates to new and useful improvements in a planting device.

The invention has for an object the construction of a planting device which is capable of discharging seed in one or more rows.

Still further the invention proposes a construction which will discharge seeds in one or more rows without breaking or hurting them.

Another object of this invention is to characterize the planting device with a plurality of resilient fingers adapted to travel around within the seeds and force them to discharge through discharging tubes.

Still further the invention proposes the construction of a planting device which has a body by which it may be attached to a cultivator or the like farming device, to be drawn along during the operation of the farming device and to discharge the seed in rows as required.

Still further the invention proposes providing the body with an annular wall portion having a plurality of openings, to associate a tube with each of said openings so as to extend downwards to near the ground and to provide a driven mechanism to force the seed through said tubes.

Still further the invention proposes the association of an annular container body superimposed upon the annular wall of said body for holding seed so that the seed control elements may work therein to discharge them.

Another one of the objects of this invention resides in the novel clamping of the container body down on the seed control elements in a manner so that the seed control elements may be individually adjusted to control the discharge of seed through one or more of the discharge tubes.

Another object of this invention resides in an arrangement which permits the seed control elements to be adjusted for various varieties and types of seeds. It is also proposed to provide an arrangement by which cotton seeds may also be discharged.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a plan view of a planting device constructed according to this invention.

Fig. 2 is a front elevational view of Fig. 1.

Fig. 3 is a plan view similar to Fig. 1 but shown with some of the top parts removed.

Fig. 4 is a bottom elevational view of Fig. 1.

Fig. 5 is a perspective view of the planting device.

Fig. 6 is a transverse sectional view taken on the line 6—6 of Fig. 1.

Fig. 7 is a longitudinal sectional view taken on the line 7—7 of Fig. 1.

The planting device, according to this invention, comprises a body 10 for attachment on a cultivator or the like farming device and having a horizontal wall 10ª formed with a plurality of openings 11. Tubes 12 depend from the wall portion 10ª and are connected with the openings 11 and extend downwards to near the ground. An annular container 13 is superimposed on the annular wall portion 10ª.

Seed control elements 14 rest upon the annular wall 10ª and are cooperative with the openings 11 and extend out between the annular wall 10ª and the container body, by which they may be manually adjusted. A means is provided for clamping the body down upon the control elements 14 and consists, essentially, of studs 15 welded or in any other manner attached to the annular container 13 and extending through lugs 16 projecting from the annular wall 10ª, and at their bottom ends provided with clamp screws 17.

A vertical drive shaft 18 is rotatively supported through the center of the body 10. A ring 19 is supported on the shaft 18 and extends over the said annular wall portion 10ª. A plurality of fingers 20 are mounted on the ring 19 and extend down into the container body 13 and over the openings 11 in said annular wall portion 10ª.

The body 10 has a frusto conical central portion 10ᵇ which at its periphery connects with the annular wall portion 10ª. These parts may be welded together at their contacting edge portions. The body also has side angle members 10ᶜ to which side bars 10ᵈ are attached. These side bars are adapted to be connected with the cultivator or other farming implement to which the planting device is intended to be connected.

The tubes 12 have flanges 12ª at their upper ends by which they are attached to the bottom face of the annular wall portion 10ª. These tubes are arranged properly spaced from each other as is desired to change the spacing of the rows of seeds. The annular container 13 is substantially in the form of a hollow cylinder. The control elements 14 comprise small pieces of flat metal, each formed with an opening 14ª adapted in one position to align with the opening 11 in the annular wall portion 10ª. These elements 14 have small projecting portions 14ᵇ which act as handles by which they may be shifted. The control elements 14 may be clamped in fixed position by tightening the wing nuts 17. This draws together the annular container 13 and the annular wall portion 10ᵃ and so clamps the control elements between.

There is an auxiliary control element 14' which is much wider than the control elements 14 and which is formed with a large elongated opening 14ᶜ. This control element also projects out between the annular body 13 and the annular container portion 13ᵃ and is provided with a small projecting portion 14ᵈ which acts as a handle. The opening 14ᶜ may be superimposed upon a rectangular opening 11' in the annular wall portion 10ᵃ. There is also a control slide 22 which extends in between the control element 14' and the annular wall portion 10ᵃ. This control slide may be held adjusted in various positions by a nut 23. This nut extends through the elongated slot 23ʳ in the control slide 22. Thus, the opening 11' may be adjusted in width as well as in depth. These large openings 11' and 14ᶜ are intended to dispense cotton.

The vertical shaft 18 extends through a bottom supporting brace and bearing 10ᵉ which is a portion of the body 10. At the lower end it is provided with a gear 24 which may be connected with a suitable drive from the cultivator or other farming implement. At the top end the shaft 18 is provided with a square portion 18ᵃ engaging through a square opening in a diametric arm 25. A nut 26 threadedly engages upon the upper end of the shaft 18 for holding the arm 25 in position. This arm 25 is formed from a central section 25ᵃ and end sections 25ᵇ. The adjacent ends of these sections are bent at right angles to the length of the arm 25 and are adjustably connected by several bolts 27 working in slots 28 of the bent portion, as clearly shown in Fig. 7.

It is thus possible to raise or lower the end portions 25ᵇ relative to the center portion 25ᵃ. The end portions 25ᵇ are fixedly connected with the ring 19 and support the ring. Each of the fingers 20 is adjustably mounted on the bottom face of the ring. For each finger there is a screw 29 which is mounted on the top end of the finger 20. Each screw 29 passes through an opening in the ring 19 and is provided with holding nuts 30 on opposite sides of the ring by which the screw may be held in various elevated positions. Thus, the fingers 20 may be moved vertically so that the lower ends of the fingers are at predetermined distances from the control elements 14 and 14'.

The operation of the device is as follows:—

The planting device is fixedly supported on a cultivator or other farming implement by bolting the arms 10ᵈ upon fixed portions of the cultivator or other farming device. It is supported at a height so that the tubes 12 are at a pre-determined position from the ground. Then the cultivator is operated to form grooves in the ground in the conventional manner and the tubes 12 are properly spaced to discharge seed into the grooves thus formed.

The seed is placed in the annular container 13. The gear 24 is driven by some driving means on the cultivator and serves to rotate shaft 18, the arm 25, and the ring 19. Since the fingers 20 project from the ring 19 they will move through the seed to agitate the seed. The seeds will fall through the openings 14ᵃ and 11' when these openings are in alignment with each other, and the seed will fall through the openings 14ᶜ and 11' when these openings are properly aligned and the slide 22 is in its open position.

The fingers 20 may be selectively adjusted to different distances from the control elements 14, or the fingers may be adjusted as a complete unit by adjusting the end portions of the arm 25.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. A planting device comprising a body for attachment on a cultivator or the like farming device and having a horizontal annular wall portion with a plurality of openings, tubes depending from said wall portion and connecting with said openings and extending downwards to near the ground, an annular container superimposed on said annular wall, seed control elements resting on said annular wall and cooperative with said openings and extending out between said annular wall and container body, means for clamping said container body down upon seed control elements, a vertical drive shaft rotatively supported on said body, a ring supported on said shaft and extending over said annular wall portion, and fingers mounted on said ring and extending down into said container and over said openings in said annular wall portion.

2. A planting device comprising a body for attachment on a cultivator or the like farming device and having a horizontal annular wall portion with a plurality of openings, tubes depending from said wall portion and connecting with said openings and extending downwards to near the ground, an annular container superimposed on said annular wall, seed control elements resting on said annular wall and cooperative with said openings and extending out between said annular wall and container body, means for clamping said container body down upon seed control elements, a vertical drive shaft rotatively supported on said body, a ring supported on said shaft and extending over said annular wall portion, and fingers mounted on said ring and extending down into said container and over said openings in said annular wall portion, said body being provided with side arms by which it may be rigidly attached to said cultivator.

3. A planting device comprising a body for attachment on a cultivator or the like farming device and having a horizontal annular wall portion with a plurality of openings, tubes depending from said wall portion and connecting with said openings and extending downwards to near the ground, an annular container superimposed on said annular wall, seed control elements resting on said annular wall and cooperative with said openings and extending out between said annular wall and container body, means for clamping said container body down upon seed control elements, a vertical drive shaft rotatively supported on said body, a ring supported on said shaft and extending over said annular wall portion, and fingers mounted on said ring and extending down into said container and over said openings in said annular wall portion, said control elements comprising pieces of metal formed with openings which may be aligned with the openings in said annular wall portion when desired.

4. A planting device comprising a body for attachment on a cultivator or the like farming device and having a horizontal annular wall portion with a plurality of openings, tubes depending from said wall portion and connecting with said openings and extending downwards to near the ground, an annular container superimposed on said annular wall, seed control elements resting on said annular wall and cooperative with said openings and extending out between said annular wall and container body, means for clamping said container body down upon seed control elements, a vertical drive shaft rotatively supported on said body, a ring supported on said shaft and extending over said annular wall portion, and fingers mounted on said ring and extending down into said container and over said openings in said annular wall portion, said control elements comprising pieces of metal formed with openings which may be aligned with the openings in said annular wall portion when desired, each control element having a projecting portion serving as a handle by which it may be moved.

5. A planting device comprising a body for attachment on a cultivator or the like farming device and having a horizontal annular wall portion with a plurality of openings, tubes depending from said wall portion and connecting with said openings and extending downwards to near the ground, an annular container superimposed on said annular wall, seed control elements resting on said annular wall and cooperative with said openings and extending out between said annular wall and container body, means for clamping said container body down upon seed control elements, a vertical drive shaft rotatively supported on said body, a ring supported on said shaft and extending over said annular wall portion, and fingers mounted on said ring and extending down into said container and over said openings in said annular wall portion, said means for clamping the container body down comprising studs attached upon the container body and passing through lugs projecting from said annular wall portion, and wing nuts upon said studs.

6. A planting device comprising a body for attachment on a cultivator or the like farming device and having a horizontal annular wall portion with a plurality of openings, tubes depending from said wall portion and connecting with said openings and extending downwards to near the ground, an annular container superimposed on said annular wall, seed control elements resting on said annular wall and cooperative with said openings and extending out between said annular wall and container body, means for clamping said container body down upon seed control elements, a vertical drive shaft rotatively supported on said body, a ring supported on said shaft and extending over said annular wall portion, and fingers mounted on said ring and extending down into said container and over said openings in said annular wall portion, said ring being attached to said shaft by reason of a diameter arm attached at its ends to said ring and at its center upon said shaft.

7. A planting device comprising a body for attachment on a cultivator or the like farming device and having a horizontal annular wall portion with a plurality of openings, tubes depending from said wall portion and connecting with said openings and extending downwards to near the ground, an annular container superimposed on said annular wall, seed control elements resting on said annular wall and cooperative with said openings and extending out between said annular wall and container body, means for clamping said container body down upon seed control elements, a vertical drive shaft rotatively supported on said body, a ring supported on said shaft and extending over said annular wall portion, and fingers mounted on said ring and extending down into said container and over said openings in said annular wall portion, said ring being attached to said shaft by reason of a diameter arm attached at its ends to said ring and at its center upon said shaft, said diameter arm having a central section and end sections vertically adjustably connected with each other.

8. A planting device comprising a body for attachment on a cultivator or the like farming device and having a horizontal annular wall portion with a plurality of openings, tubes depending from said wall portion and connecting with said openings and extending downwards to near the ground, an annular container superimposed on said annular wall, seed control elements resting on said annular wall and cooperative with said openings and extending out between said annular wall and container body, means for clamping said container body down upon seed control elements, a vertical drive shaft rotatively supported on said body, a ring supported on said shaft and extending over said annular wall portion, and fingers mounted on said ring and extending down into said container and over said openings in said annular wall portion, said ring being attached to said shaft by reason of a diameter arm attached at its ends to said ring and at its center upon said shaft, said diameter arm having a central section and end sections vertically adjustably connected with each other, by end portions bent at right angles to the arm and formed with elongated slots through which holding bolts engage.

9. A planting device comprising a body for attachment on a cultivator or the like farming device and having a horizontal annular wall portion with a plurality of openings, tubes depending from said wall portion and connecting with said openings and extending downwards to near the ground, an annular container superimposed on said annular wall, seed control elements resting on said annular wall and cooperative with said openings and extending out between said annular wall and container body, means for clamping said container body down upon seed control elements, a vertical drive shaft rotatively supported on said body, a ring supported on said shaft and extending over said annular wall portion, and fingers mounted on said ring and extending down into said container and over said openings in said annular wall portion, said ring being attached to said shaft by reason of a diameter arm attached at its ends to said ring and at its center upon said shaft, said diameter arm having a central section and end sections vertically adjustably connected with each other, by end portions bent at right angles to the arm and formed with elongated slots through which holding bolts engage, each of said fingers being mounted on a screw engaging through said ring and held in fixed positions by nuts upon the screw engaging opposite sides of said ring.

DOMINGO OLIVARES.